Nov. 14, 1939.   R. D. CONKLIN   2,179,815
VALVE MECHANISM
Filed Aug. 19, 1938    2 Sheets-Sheet 1
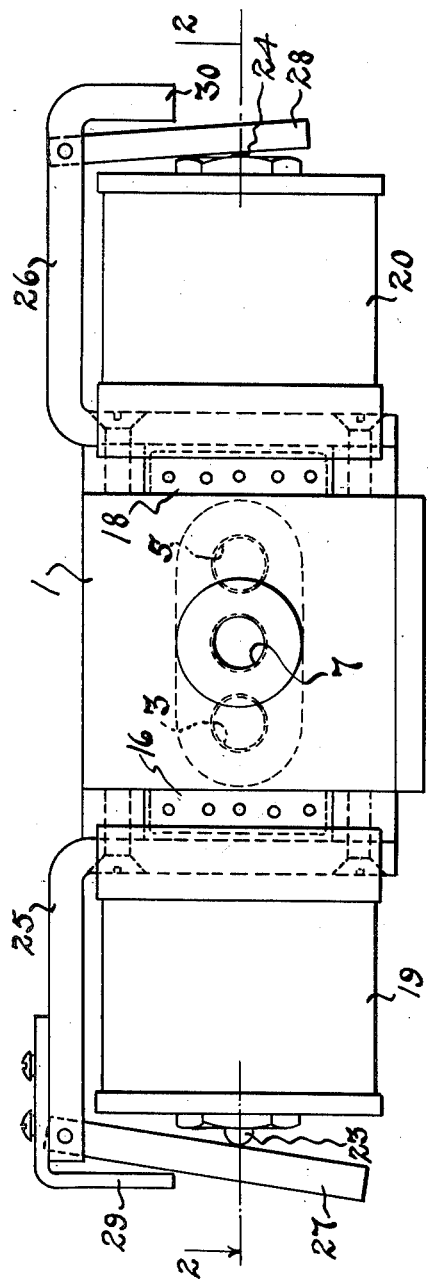
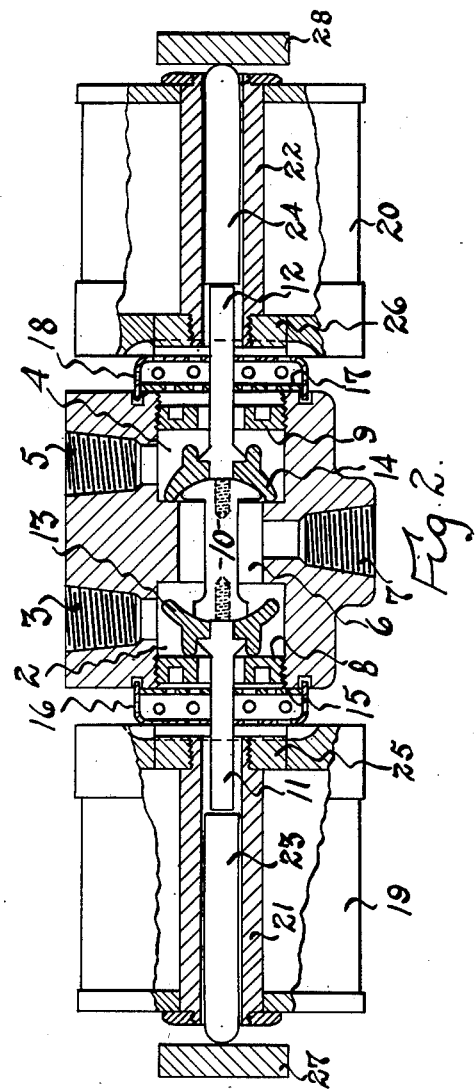
INVENTOR.
Roscoe D. Conklin
BY
Danty & Danty
ATTORNEYS.

Nov. 14, 1939.  R. D. CONKLIN  2,179,815
VALVE MECHANISM
Filed Aug. 19, 1938  2 Sheets-Sheet 2

INVENTOR.
Roscoe D. Conklin
BY
Darby & Darby
ATTORNEYS.

Patented Nov. 14, 1939

2,179,815

UNITED STATES PATENT OFFICE

2,179,815

VALVE MECHANISM

Roscoe D. Conklin, Rahway, N. J., assignor to National Pneumatic Company, New York, N. Y., a corporation of West Virginia Application August 19, 1938, Serial No. 225,688

5 Claims. (Cl. 137—139)

This invention relates to improvements in valve mechanism of the type which are electro-magnetically operated or electro-magnetically and fluid pressure operated.

Among the objects of this invention is to provide valves of these types which are simple in construction.

A further object of this invention is the provision of power actuated valves of this type particularly adapted for use in connection with vacuum engines.

These and other objects as will appear from the following disclosure are secured by the invention herein disclosed.

This invention resides substantially in the combination, construction, arrangement and relative location of parts, all in accordance with the following disclosure.

In the accompanying drawings,

Figure 1 is a side elevational view of the electro-magnetically operated type of valve comprising this invention;

Figure 2 is a cross-sectional view taken on the line 2—2 of Figure 1;

Figure 3:
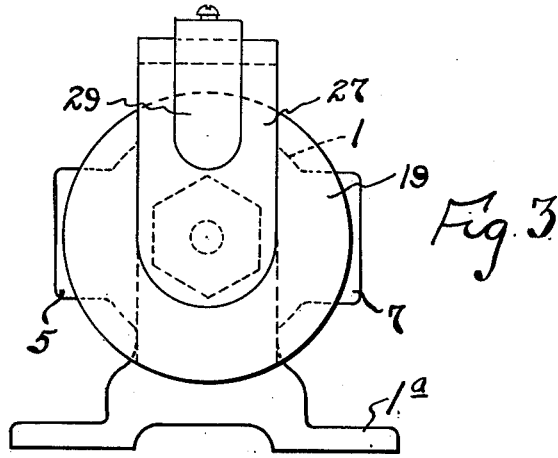
Figure 3 is a lefthand end elevational view of the structure of Figure 1.

In the structure of Figures 1, 2 and 3 the valve proper comprises a block or casing 1, having a pair of chambers 2 and 4 formed therein and opening exteriorly of the block on a pair of opposite bosses. These chambers are separated by a division wall which has an enlarged passage 6 therethrough by means of which they are connected. A threaded port 3 is provided for the chamber 2, a threaded port 5 is provided for the chamber 4, and a threaded port 7 connects with the passage 6.

The chambers 2 and 4 are closed at their outer ends by means of screw plugs 8 and 9 respectively, each of which has a central passage as shown, and each of which provides a valve seat on its inner face. Both sides of the partition separating the chambers 2 and 4 provide valve seats. The valve assembly comprises a central connecting piece 10 and a pair of valve stems 11 and 12 on which are mounted the valves 13 and 14. The valves 13 and 14 alternately seat on opposite faces of the central partition and on the inner faces of the closure plugs 8 and 9. Thus, when valve 14 is seated on the central partition closing off passage 6 from chamber 4, valve 13 is seated on the casing member 8 closing off chamber 2 from the atmosphere through the passage in the closure member. The valve members 13 and 14 are preferably made of a flexible material such as rubber or a rubber composition, but of course, may be made of any material commonly used for valve members.

The valve stems 11 and 12 pass respectively through perforated plates 15 and 17 which with the perforated cup shaped members 16 and 18 form air strainers through which the air passes on its way to the valve. If desired, and in accordance with common practice, these strainers may be filled with any material suitable for the purpose of filtering the air, such as steel wool or fibrous packing material.

At 19 and 20 are electro-magnets which have the cores 21 and 22 respectively to form in combination therewith solenoids. Slidably mounted in the tubular cores 21 and 22 are the plungers 23 and 24 which are preferably of non-magnetic material such as brass. It may be noted at this point that the valve stems 11 and 12 are preferably of a non-magnetic material such as brass.

At 25 and 26 are brackets preferably of magnetic material which, together with the solenoid, are mounted on the sides of the valve body block in any suitable manner as by means of machine screws, as illustrated in Figure 1. Pivotally mounted on these brackets 25 and 26 are the magnetizable armatures 27 and 28 respectively, which are positioned to engage the ends of the plungers 23 and 24 respectively. The bracket 26 is bent over as shown at 30 to form an integral stop member to be engaged by the armature 28. Mounted on the other bracket 25 is a depending arm 29 which may be longitudinally adjusted thereon by means of the screws as shown to provide a smaller stop for the armature 27. By adjusting the stop member 29 the movement of the valve assembly may be adjusted as required.

In the operation of this valve structure when employed in connection with so-called vacuum engines, it is accomplished by connecting the vacuum source to the threaded passage 7 while the threaded passages 3 and 5 are connected to the respective ends of the cylinder of the vacuum engine. The windings of the solenoids 19 and 20 are arranged so that either one or the other is at all times in circuit when the valve is being used. Let it be assumed for example that the arrangement as shown in Figure 2 is connected to a door operating system, and that the door is closed with the valve assembly in the position shown. At this time the solenoid 20 is energized to hold the valve asembly in the position shown. The armature 28 is attracted to the position illustrated by the magnetic field of the solenoid, with the result that the plunger 24 has pushed the valve assembly to the position shown. At this time, as will be apparent, the end of the cylinder of the engine connected to the threaded port 3 is connected to the vacuum source through the passages 6 and chamber 2. At the same time the other end of the engine cylinder is connected to the atmosphere through the threaded passage 5, chamber 4, the central passage in the closure member 9 and the strainer 17 and 18.

In order to open the door a switch such as a push button switch in the circuit to the solenoid is closed. This switch is preferably interconnected with the switch controlling the solenoid winding 20 so that when the solenoid 19 is energized, solenoid 20 will be de-energized. The field of the energized solenoid 19 attracts the armature 27, moving the valve assembly from the position shown so that valve 14 unseats from the central partition and seats on the closure member 9, while valve 13 unseats from the closure member 8 and seats on the central partition. Thus the end of the cylinder connected to the passage 3 is cut off from the vacuum source and open to the atmosphere through the passage in the closure member 8 while the end connected to the passage 5 is connected to the vacuum source through the central passage 6 and chamber 4. Thus the engine opens the door and holds it open as long as the circuit to the solenoid 19 is held closed. To close the door this circuit is broken and the one to the solenoid 20 is made.

Figure 4:
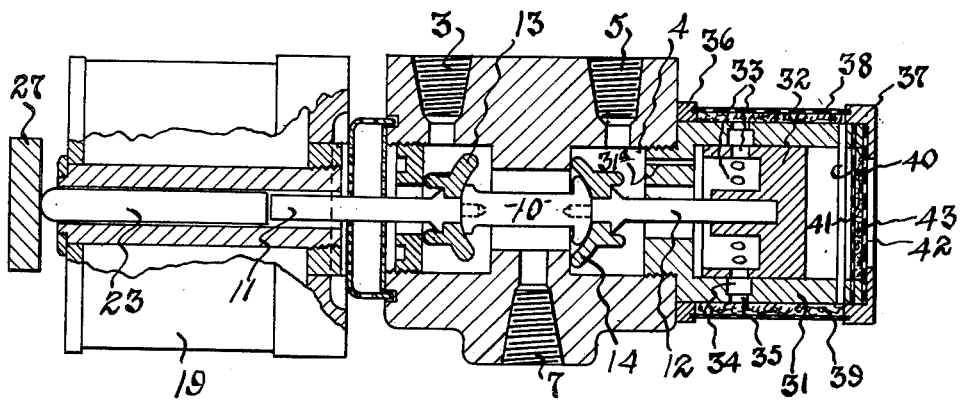
Figure 4 is a view similar to Figure 2 of a modified form of valve in accordance with this invention, which valve is both electro-magnetically and fluid pressure operated.
Figure 5:
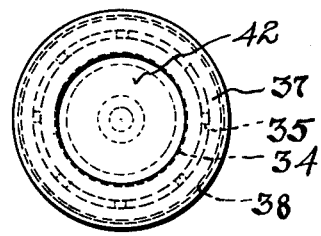
Figure 5 is a righthand end elevational view of the structure of Figure 4.

In the valve of Figures 4 and 5 the solenoid 20 with its armature structure and plunger has been removed as well as the strainer members 17 and 18 and the closure member 9. In place thereof there is mounted a cylinder 31 which has an integral externally threaded boss on the end which fits into the threads which firmly hold the closure member 9 in place. This boss has a center passage which opens into the chamber of the cylinder 31. Slidably mounted in the cylinder is a piston 32 which is connected to the valve stem 12. This piston has a surface groove on one end as shown to form a cylindrical skirt which is provided with a plurality of ports 33 in circumferential alignment. With the valve 14 seated as shown these ports are aligned with an annular groove 34 on the inner wall of the cylinder 31. The groove 34 communicates with a series of ports 35. At 36 is a ring mounted on the periphery of the cylinder 31 adjacent the valve block 1 which in conjunction with a ring 37 forms a seat for a screen 38. Interposed between the screen and the cylinder wall is a filling of filtering material 39 similar to that previously described such as steel wool or fibrous material. The ends of the cylinder first open to the atmosphere through a filtering arrangement comprising a pair of screens 41 and 42 held in spaced relation by a ring as shown with the space between them filled as before with a suitable filtering material 43. The ring 37 in addition to supporting one end of the screen 38 clamps the filter compressing the screens 41 and 42 and filtering material 43 in place on the end of the cylinder 38. A pin 40 mounted just inside of the screen 41 extends across the cylinder to lock the piston in the cylinder. The cylinder boss is provided with a small bleed tube 31a positioned so as to interconnect the cylinder with the chamber 4.

As in the case of the previous structure, it is to be assumed that the valve assembly shown in Figure 4 is in door closed position. In order to open the door the circuit to the solenoid 19 is energized so that armature 27 is attracted, with the result that valve 13 is seated on the central partition and valve 14 is seated on the end of the boss of the cylinder 31, closing the passage through it. The end of the engine cylinder is thus disconnected from the vacuum source and connected to atmosphere as before. At the same time the other end is connected to the vacuum source through the port 5. The movement of the valve assembly carries the piston 32 to the right so that when the passage through the boss is closed by valve 14 the annular groove 34 in the cylinder is sealed by the skirt on the piston 32. However, the lefthand end of the cylinder is connected through the restricted passage 31a with chamber 4 which is now of course connected to the vacuum source. Thus the lefthand end of the cylinder 31 is gradually bled of air so that subatmospheric pressure is created therein. The result is that at the moment the solenoid 19 is de-energized the right-hand end of piston 32 being exposed to the atmosphere it snaps the valve assembly back to the position shown in Figure 4 setting up the necessary connections to the vacuum engine so that the door is closed. The end of the engine connected to the passage 5 may exhaust to atmosphere through the passage in the boss of the cylinder 31, the ports 33, annular groove 34, and ports 35 into the filling material 39 and through the screen 38.

From the above description it will be apparent to those skilled in the art that many modifications may be made without departure from the novel subject matter herein disclosed. I do not, therefore, desire to be strictly limited to the disclosure as given for purposes of illustration, but rather to the scope of the appended claims.

What I seek to secure by United States Letters Patent is:

1. A valve structure comprising a casing having two compartments connected by a passage and each having a port to be connected to the device to be controlled and a port to connect it to the atmosphere, said casing having a port opening into said passage, a pair of valves arranged respectively to isolate one of said compartments from said passage while opening its atmospheric port and connecting the other compartment to said passage while closing its atmospheric port, electro-magnetic means for operating the valve to one of its positions, and pressure fluid means for operating the valve to the other of its positions.

2. A valve structure including a casing having a pair of compartments connected by a passage and each having a port to the atmosphere, a port for said passage formed in said casing, and a port for each of said compartments formed in said casing, valves movably mounted in said casing for disconnecting said passage from one of said compartments while closing the atmospheric port of the other, electro-magnetic means for operating the valves in one direction, and pressure fluid operated means comprising a cylinder and piston for actuating the valves in the other direction, said cylinder being connected to one of said compartments.

3. In a valve structure of the type described the combination including a casing forming a pair of compartments connected by a passage and each compartment having a port to the atmosphere, said casing having three ports two of which open into said compartments respectively and the third of which opens into said passage, a pair of ports being adapted to be connected to the device to be controlled by the valve and the third being adapted to be connected to a vacuum source, valve means movably mounted in said casing for isolating one of said compartments from said passage while connecting the other to it, and closing the compartment connected to it at its atmospheric port, a cylinder connected to the other compartment having a piston therein for actuating said valves, said cylinder being open to the atmosphere at the opposite end, and electro-magnetic means for operating the valves in one direction.

4. A valve combination including a casing having a pair of compartments connected by a passage terminating in seats at each end, a pair of opposed valve members arranged to alternately rest on said seats, electromagnetic means for conjointly operating said valves in one direction, said casing having a pair of connection ports communicating with said compartments and a connection port communicating with said passage, means forming ports to the atmosphere for said compartments having seats for said valves, each of said valves resting on said last seats alternately so that when one valve rests on one of said first seats the other valve rests on one of said second seats, one of said means being a cylinder having a restricted connection to the associated compartment and a piston in said cylinder connected to said valves.

5. A valve combination including a casing having a pair of compartments connected by a passage terminating in seats at each end, a pair of opposed valve members arranged to alternately rest on said seats, electromagnetic means for conjointly operating said valves in one direction, said casing having a pair of connection ports communicating with said compartments and a connection port communicating with said passage, means forming ports to the atmosphere for said compartments having seats for said valves, each of said valves resting on said last seats alternately so that when one valve rests on one of said first seats the other valve rests on one of said second seats, one of said means being a cylinder having a restricted connection to the associated compartment, and a piston having a skirt in said cylinder and connected to said valves, the skirt of said piston having ports therethrough and said cylinder having an annular groove connected to the atmosphere, said skirt sealing the annular groove when said electromagnetic means operates the valves in one direction.

ROSCOE D. CONKLIN.